(12) United States Patent
Luc

(10) Patent No.: US 7,292,504 B2
(45) Date of Patent: Nov. 6, 2007

(54) SEISMIC SENSORS

(75) Inventor: Francois Luc, Sydney (AU)

(73) Assignee: Sercel Australia Pty Ltd. (AU)

( * ) Notice: Subject to any disclaimer, the term of this patent is extended or adjusted under 35 U.S.C. 154(b) by 316 days.

(21) Appl. No.: 10/513,901

(22) PCT Filed: May 9, 2003

(86) PCT No.: PCT/AU03/00562

§ 371 (c)(1),
(2), (4) Date: May 19, 2005

(87) PCT Pub. No.: WO03/096021

PCT Pub. Date: Nov. 20, 2003

(65) Prior Publication Data

US 2005/0201206 A1     Sep. 15, 2005

(30) Foreign Application Priority Data

May 10, 2002 (AU) ................................. PS2256

(51) Int. Cl.
*G01V 1/18* (2006.01)
(52) U.S. Cl. .................................................. 367/185
(58) Field of Classification Search ................ 367/185, 367/178, 12; 181/122
See application file for complete search history.

(56) References Cited

U.S. PATENT DOCUMENTS

| | | | |
|---|---|---|---|
| 2,695,165 A | 11/1954 | Hansen | |
| 5,475,652 A | 12/1995 | McNeel et al. | |
| 5,606,124 A | * 2/1997 | Doyle et al. | 73/152.01 |
| 6,353,577 B1 | * 3/2002 | Orban et al. | 367/178 |
| 6,412,592 B1 | 7/2002 | Meynier | |
| 2005/0201206 A1 | * 9/2005 | Luc | 367/182 |

FOREIGN PATENT DOCUMENTS

| | | |
|---|---|---|
| EP | 0 264 509 | 2/1992 |
| EP | 1 061 382 | 12/2000 |
| GB | 1526289 | 9/1978 |
| WO | WO 3096071 A1 * | 11/2003 |

* cited by examiner

*Primary Examiner*—Daniel Pihulic
(74) *Attorney, Agent, or Firm*—Connolly Bove Lodge & Hutz LLP

(57) ABSTRACT

A method for compensating the effect of gravity on seismic sensors such as geophones and a gravity effect-free seismic sensor are disclosed. The gravity effect-free seismic sensor of the present invention includes primary sensor (100) operatively responsive to seismic movements and hence generating a seismic signal by having a coil placed in a magnetic field in a first axis of sensitivity (105); an auxiliary sensor (210) operatively responsive to a gravity field for generating a tilt signal, thus provide current to the coil of the primary sensor (100) to induce a force on the coil that at least partially compensates for a weight of the coil, thus ameliorating or eliminating a gravity effect on the primary sensor (100).

27 Claims, 2 Drawing Sheets

SEISMIC SENSORS

FIELD OF THE INVENTION

The present invention is directed, in general, to the field of seismic exploration and, more particularly, to seismic sensors such as geophone assemblies. It also relates to a method for at least partially compensating for the effect of gravity on seismic sensors.

DESCRIPTION OF THE PRIOR ART

In marine seismic exploration such as seismic geophysical surveys, a seismic signal is introduced into the earth by using a seismic source. The seismic signal propagates through the earth in the form of a spherical wave front. As the wave front impinges upon subsurface geologic formations, a portion of the wave front is reflected upwardly from formation interfaces back to the earth's surface. The reflected waves are recorded by a plurality of sensors and the recorded data is processed to obtain information about the earth's subsurface. In seismic exploration on land, shallow water and marsh lands, geophones are typically used as sensors.

The basic principles of conventional geophones have been known for many years: a coil of electrical wire is suspended from a spring in the center of permanent magnets. The mass of the coil, suspended from the spring, tends to remain stationary when the case moves up and down. This causes the electrical coil to move through the DC magnetic field of the permanent magnets and induces small electrical currents in the coil. Vibrations above the resonance frequency of the coil-spring system cause an electrical voltage to be produced at the coil which is proportional to the velocity of motion. Resonance frequency is one of the important characteristics of a conventional geophone. A lower resonance frequency is generally desirable, but is more difficult to achieve. Conventional geophones commonly have a resonance frequency in the range from 1 Hz to about 10 Hz. Geophones are very sensitive and can detect the ambient seismic background noise of the earth. Nevertheless achieving such sensitivity at low frequencies requires very a supple spring. Due to stroke limitations, the spring cannot compensate for the weight of the coil for all directions. Therefore, different types of geophones are used for horizontal or vertical measurements (verticality being defined by the local gravity field). Such geophones typically maintain their performance specifications within a range of 20 degrees of tilt, beyond which the geophones provide no useful information. Hence, when deploying such prior art geophones, it is necessary to orient the geophone in the gravity field within the specific range of tilt angles for which the unit is designed to operate.

Some geophones have been developed with an extended stroke in order to be used in any orientation. Nevertheless, due to spatial variations of the DC magnetic field in the device and spring non-linearity, those geophones exhibit a high non-linearity and a sensitivity varying with orientation. This last point is a very significant drawback when three axis systems are to be used since it degrades "vector fidelity". It is also a problem when geophones are combined with hydrophones as is often the case in ocean bottom operations.

When used on land, geophone orientation is usually achieved manually by using a level bubble built inside the geophone case. An alternative is to use gimbals (disclosed in U.S. Pat. No. 5,475,652) to orient the geophone when it cannot be done during deployment, as is the case for ocean bottom geophysical surveys. Gimbals usually introduce parasitic resonances that have to be damped using viscous damping liquids which can negatively impact on the operation of the sensors. For example, temperature change significantly alters the fluid viscosity in a gimbal structure. Some solutions have been proposed to lock the gimbals after deployment, like the one disclosed in U.S. Pat. No. 6,061,302, but the end result is a complex and expensive mechanical system.

The use of accelerometers is an alternative to geophones. Nevertheless, the resolution needed to match geophone performance should be better than 1 micro-G. Therefore such an accelerometer must have a dynamic range of above 126 dB. Some Micro-machined Electro Mechanical Systems (MEMS) type of accelerometers have been recently developed for such an application, like the one disclosed in Vectorseis Pat. No. WO055646A1, but their cost is much higher than the cost of traditional geophones due to the additional complexity. On top of that the very high dynamic is much higher than what is required for geophysical operations and what can even be recorded by the usual 24 bit analog to digital converters.

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

SUMMARY OF THE INVENTION

Accordingly, the preferred embodiment of the invention provides a method for compensating for the effect of gravity on seismic sensors and thus an improved sensor assembly which:

(i) has performance characteristics which are substantially independent of the tilt of the sensor with reference to a local gravitational field;

(ii) can be deployed without having to mechanically control the tilt of the sensor;

(iii) is simple to accomplish and manufacture;

(iv) is reasonably cost effective as compared to comparable currently available sensors; and (v) is useful in applications such as ocean bottom seismic exploration.

In accordance with a first aspect of the present invention there is provided a seismic sensor including:

a primary sensor operatively responsive to seismic movements so as to generate a seismic signal, said primary sensor having a coil placed in a magnetic field, said primary sensor defining a first axis of sensitivity;

an accelerometer for use as an auxiliary sensor for generating a tilt signal indicative of a tilt of the auxiliary sensor with reference to said gravitational field, said auxiliary sensor defining a second axis of sensitivity parallel to said first axis of sensitivity; and a current generator including a filter for determining a DC voltage in response to said tilt signal so as to provide a current to said coil to induce a force on the coil that at least partially compensates for a weight of the coil, thereby ameliorating or eliminating a gravitational effect on said primary sensor.

According to a second aspect of the invention the is provided a geophone assembly including.

a geophone operatively responsive to seismic movements so as to generate a seismic signal, said geophone having a coil placed in a magnetic field in a first axis of sensitivity, a tilt sensor operatively responsive to a gravitational field for generating a tilt signal indicative of an orientation of the sensor with reference to said gravitational field, said tilt sensor having a second axis of sensitivity parallel to said first of sensitivity;

a current generator responsive to said tilt signal so as to provide a current to said coil to induce a force on the coil that at least partially compensates for a weight of the coil, thereby ameliorating or eliminating a gravitational effect on said geophone, means for damping a resonance of said geophone, said damping means being electrically coupled in parallel with said geophone and in series with said sensor; and said current generator including a low pass filter for determining a DC voltage in response to said tilt signal to induce said current, said low pass filter being connected in series with, and between, said tilt sensor and said damping means.

According to another aspect of aspect of the invention there is provided a method of gravity compensation for a seismic sensor, said method including the steps of:

providing a seismic sensor responsive to seismic movements, said seismic sensor having a coil placed in a magnetic field, said seismic sensor defining a first axis of sensitivity; and using an accelerometer having a second axis of sensitivity parallel to said first axis of sensitivity, said accelerometer being in combination with a law pass filter to generate an external bias current within said coil to induce a force on the coil that at least partially compensates for a weight of said coil, thereby ameliorating or eliminating a gravity effect on said seismic sensor.

BRIEF DESCRIPTION OF THE DRAWINGS

Preferred embodiments of the invention shall be described, by way of example only, with reference to the accompanying drawings in which.

DESCRIPTION OF THE PREFERRED EMBODIMENTS

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Moreover, while the present invention is illustrated by a number of preferred embodiments directed to ocean bottom systems, it is not intended that these illustrations be a limitation on the scope or applicability of the present invention. Apart from ocean bottom systems, the present invention is also applicable other applications such as both land and shallow water operations as well as to seismic streamers. Further, various parts of the present invention have not been drawn to scale. Certain dimensions have been exaggerated in relation to other dimensions in order to provide a clearer illustration and understanding of the present invention.

Figure 1:
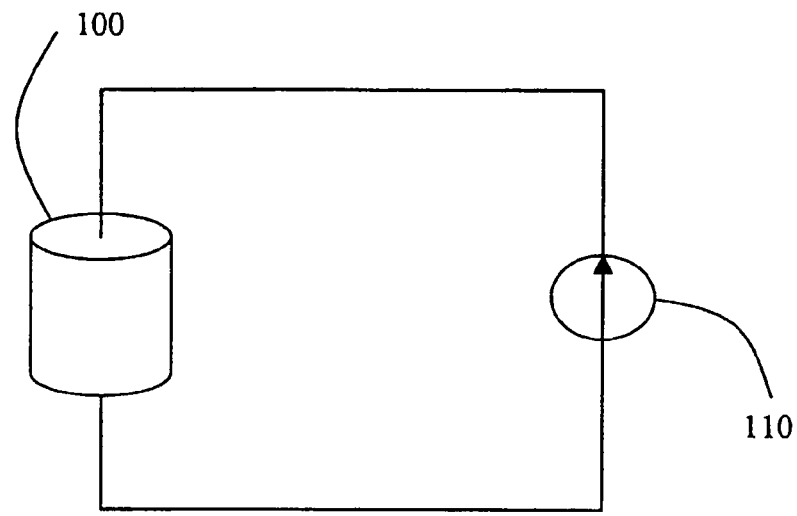
FIG. 1 is a schematic illustration showing a method for compensating for the effect of gravity on geophones according to a preferred embodiment of the present invention.

In accordance with the present invention, a method for compensating for the effect of gravity on seismic sensors such as geophones and a substantially gravity effect-free geophone assembly and seismic sensor are provided. Referring initially to FIG. 1, illustrated is a schematic showing the method for at least partially compensating for the effect of gravity on seismic sensors such as geophones. The preferred method includes the steps of, first, providing a seismic sensor such as a geophone 100, which may be any conventional geophone, for example one having a coil of electrical wire suspended from a spring in a DC magnetic field, in the center of permanent magnets. And, second, generating an external bias current 110 to the electrical coil of the geophone 100 to induce a force on the electrical coil that at least partially compensates for a weight of the electrical coil, thus ameliorating or eliminating the gravity effect on the geophone 100. Hence, a seismic sensor in accordance with the preferred embodiment can automatically compensate for the tilt of the sensor with reference to gravity. In other words, the preferred seismic sensor can provide reliable and accurate seismic measurements regardless of its tilt with reference to gravity (ie vertical or horizontal deployment).

Figure 2:
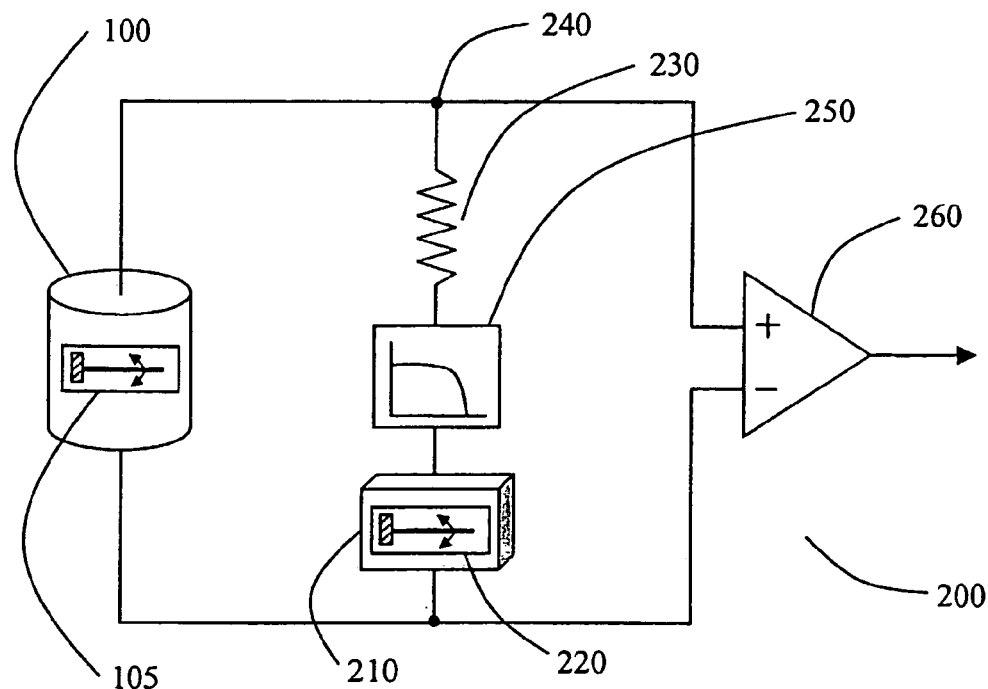
FIG. 2 is a schematic illustration of a preferred embodiment of a gravity effect-free geophone assembly according to a preferred embodiment of the present invention.

Now referring to FIG. 2, illustrated is a schematic circuit diagram of a preferred embodiment of a seismic sensor 200 which includes a primary sensor 100 which forms part of a geophone. The primary sensor 100 has a coil placed in a magnetic field such that the coil is operatively responsive to seismic movements so as to generate a seismic signal. In other words, the primary sensor 100 is adapted to measure seismic movements of, for example, a sea bed, the ground, etc. The primary sensor 100 has an axis of sensitivity 105 which is the axis along which seismic movements are measured. The axis of sensitivity 105 of the primary sensor 100 is shown as horizontal in FIG. 2.

An accelerometer functions as an auxiliary sensor 210 which generates a tilt signal indicative of the tilt of the sensor 210 with reference to the local gravitational field. Hence, the output signal provided by the auxiliary sensor 210 is indicative of whether the auxiliary sensor 210 is tilted vertically upwards, vertically downwards, or somewhere in between those two extremes. Another preferred embodiment makes use of a tilt sensor. Preferably the output of the tilt sensor is given by a function which is substantially equal to the following term:

$\sin(\theta)$ where $\theta$ is the angle of inclination of the axis of sensitivity of the tilt sensor relative to the local gravitational field.

This allows the compensation for gravitational effects achieved within some preferred embodiments to be effectively perfect to within acceptable tolerances. In other preferred embodiments the output of the tilt sensor is given by a function which is substantially proportional to, or substantially includes, the $\sin(\theta)$ term.

In the illustrated preferred embodiment the auxiliary sensor 210 takes the form of a tilt sensor 210 with an axis of sensitivity 220 parallel to the axis of sensitivity 105 of the geophone 100. The tilt sensor 210 is preferably provided by any low cost micro-machined electro mechanical system (MEMS) accelerometer, for example the ones without electromechanical feedback that have been developed recently for various commercial applications such as in the automotive industry. Those accelerometers, such as ADXL-05 by Analog Device, have a typical resolution of about 1 mG which is much too high for a seismic application (ie to function as the primary sensor in the present invention) but can be used as tilt sensors with an overall resolution of better than 5 degrees.

The tilt sensor 210 is responsive to the local gravitational field so as to generate a DC tilt signal. This, in combination with a low pass filter 250, functions as a current generator which provides a current to the coil of the primary sensor 100. It will be appreciated by those skilled in the art that a current is caused by a voltage and hence the scope of the term "current generator" as used in this document is to be construed as including a "voltage generator".

The current provided by the current generator induces a force on the coil that at least partially compensates for the downwards force on the coil due to gravity. Preferably the compensation provided by the current is sufficient to effectively bring the coil of the primary sensor 100 to its operative position within the relevant tolerances as required for accurate performance. This ameliorates or more preferably effectively eliminates the gravitational effect on the performance of the primary sensor 100. Hence, in practice, less care is required to deploy the preferred embodiment of the invention as compared to the prior art. Also, use of the preferred embodiment avoids the prior art requirement to use the appropriate sensor for the required deployment orientation. Instead, the preferred embodiment is effective for any deployment orientation.

Geophone sensitivity is normally defined as within 2% for close tolerance geophones. This corresponds to a compensation of orientation within 3 degrees. If a 5 degree resolution of the tilt sensor 210 is added, the present invention allows for gravity compensation within better than 10 degrees, which is less than the 20 degrees of tilt a usual geophone can handle. Therefore, no additional calibration process is needed to match the tilt sensor 210 to the geophone 100. This eases the manufacturing requirements for the preferred embodiment.

As mentioned earlier, the DC output of the tilt sensor 210, in combination with the low pass filter 250, is used to generate the DC current in the geophone coil to induce the force on the moving mass that will at least partially compensate for the weight of the electrical coil. Because of the reciprocity of the electromechanical equations, an ideal geophone with a sensitivity of, say, 27 V/(m/s), when used as an actuator, generates a force on the coil of 27 N/A. Therefore, the maximum current needed to compensate the weight of the typically 11 grams of geophone coil is 11 times 9.81 divided by 27 which equals 4 mA.

Figure 3:
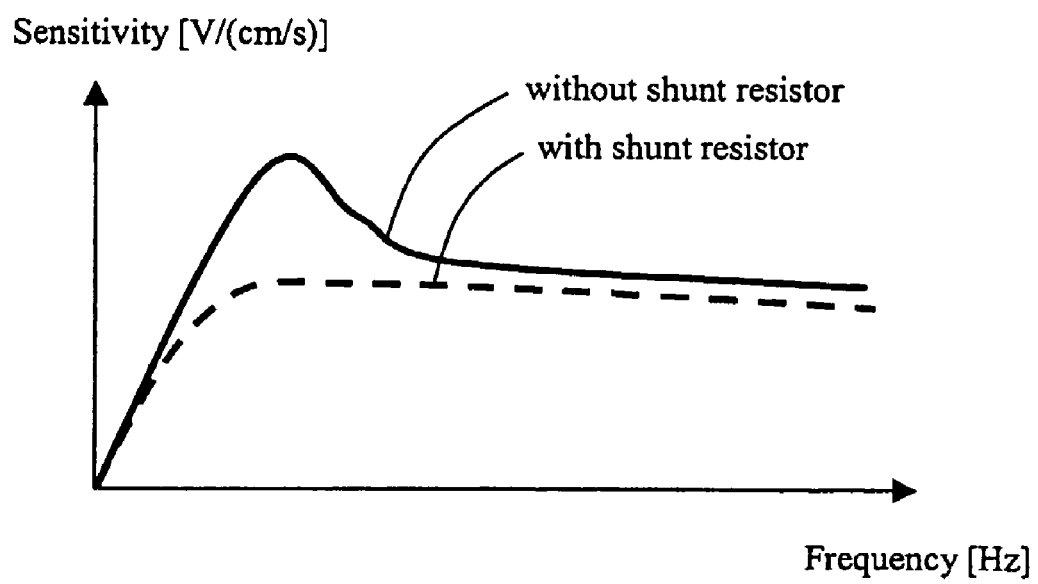
FIG. 3 is an illustration of a graph showing the sensitivity of a geophone versus frequency, with and without a shunt resistor.

Usually the geophone 100 is used together with a shunt resistor 230 to damp the main resonance of the geophone 100 as shown in FIG. 3, thus providing a smooth frequency response. For a standard geophone, for example a GS32-CT, coil resistance is about 400 ohms and a 70% damping of the resonance is usually achieved by use of a shunt resistance of about 1000 ohms. In order to generate the DC current for gravity compensation, the preferred embodiment of the present invention applies a DC voltage between the geophone 100 and shunt resistor 230 at a coupling node 240. For a total resistance of 1000 plus 400 which equals to 1400 ohms, the maximum voltage needed to induce the 4 mA current for compensating the full gravity field is 1400 times 0.004, which equals 5.6 V, and the power consumption is then 5.6 times 0.004 which equals 22 mWatts. Some commercial tilt sensors 210 have a power consumption as low as 10 mWatts. Therefore the total additional power needed is in the order of 30 mWatts (22 mWatts plus 10 mWatts) per channel, which is about one tenth of power consumption for modem MEMS prior art solutions.

The DC Voltage at the coupling node 240 is determined by low pass filtering the tilt signal with adequate gain, that is, having a low pass filter 250 placed in series with, and between, the tilt sensor 210 and the shunt resistor 230. The low pass filter 250 has a low pass cut off frequency lower than the resonance frequency of the geophone 100, and preferably much lower. In yet another embodiment the low pass filter 250 has a cut-off frequency lower than the frequency of interest for the seismic signal. As will be apparent to those skilled in the art in light of the low cut off frequency, the low pass filter 250 also has a long time constant, for example in the order of minutes. The use of a low pass filter advantageously helps to ensure that any AC noise that may be caused by the tilt sensor 210 is not allowed to corrupt the seismic signal provided by the seismic sensor 100, Moreover, the preferred embodiment of the present invention includes a preamplifier 260, such as an operational amplifier, for producing a seismic output signal to recorded. The seismic output signal is proportional to the seismic signal of the primary sensor 100.

Referring back to the preferred method for compensating for the effect of gravity on seismic sensors, the method further includes the steps of detecting the gravity field by using the accelerometer 110 thus producing a tilt signal; low bass filtering the tilt signal produced by the accelerometer 210 to generate the external bias current 110; and applying the external bias current to the electrical coil of the geophone 100, all within the step of generating the external bias current 110 to the electrical coil of the geophone 100. Apart from that, the method of the preferred embodiment of the present invention also includes the step of damping the resonance of the primary sensor 100. A gravity compensated seismic output signal is preferably generated by amplifying the output of the primary sensor 100, for example by use of an operational amplifier 260. Preferably the low pass filter used in method has a cutoff frequency which is lower than a resonance frequency of said primary sensor.

It will be appreciate by those skilled in the art that geophones are usually best adapted to function at frequencies which are above a given resonance frequency and it is generally preferable for the resonance frequency to be as low as possible. It is also usually preferable for geophones to have a response linearity that is as high as possible. For these reasons, it is typically preferable for the stroke of the coil in geophones to be limited to a few millimeters. In the prior art, a short stroke, combined with the use of a supple spring, can undersirably allow gravitational forces to displace the coil away from its optimum neutral resting position. More particularly, it is generally the component of the gravitational force which acts along the axis of sensitivity which causes the undesirable displacement of the coil in prior art geophones. The resultant static off-set to the coil position has serious consequences for the performance of the qeophone and for this reason, usage of prior art geophones is typically limited to within a narrowly defined range of inclinations relative to gravity (e.g. with axes of sensitivity which are within +/−20 deg of horizontal, or which are vertically aligned). It is this gravitational effect which the preferred embodiment of the present invention seeks to ameliorate or eliminate by generating an appropriate quasi-static current in the coil so that, for any orientation, the coil is subject to an induced electromagnetic force which preferably tends to urge the coil toward the optimum neutral testing position, and more preferably displaces the coil to the optimum neutral resting position. Hence, the preferred embodiment of the present invention can be effectively deployed with its axis of sensitivity at any inclination relative to the local gravitational field.

Although specific embodiments have been illustrated and described, it will be obvious to those skilled in the art that various modifications may be made without departing from what is intended to be limited solely by the appended claims.

The invention claimed is:

1. A seismic sensor including:
   a primary sensor operatively responsive to seismic movements so as to generate a seismic signal, said primary sensor having a coil placed in a magnetic field, said primary sensor defining a first axis of sensitivity;
   an accelerometer for use as an auxiliary sensor for generating a tilt signal indicative of a tilt of the auxiliary sensor with reference to a gravitational field, said auxiliary sensor defining a second axis of sensitivity parallel to said first axis of sensitivity; and a current generator including a filter for determining a DC voltage in response to said tilt signal so as to provide a current to said coil to induce a force on the coil that at least partially compensates for a weight of the coil, thereby ameliorating or eliminating a gravitational effect on said primary sensor.

2. A seismic sensor according to claim 1 wherein said filter is connected in series with said auxiliary sensor.

3. A seismic sensor according to claim 2 wherein said filter is connected in parallel with said primary sensor.

4. A seismic sensor according to claim 1 further including damping means for damping a resonance of said primary sensor.

5. A seismic sensor according to claim 4 wherein said damping means is electrically coupled in parallel with said primary sensor and in series with said auxiliary sensor.

6. A seismic sensor according to claim 1 further including means for producing a seismic output signal.

7. A seismic sensor according to claim 6 whereby said seismic output signal is proportional to said seismic signal.

8. A seismic sensor according to claim 1 wherein said primary sensor is a geophone.

9. A seismic sensor according to claim 1 wherein said accelerometer is a micro-machined electro mechanical system accelerometer.

10. A seismic sensor according to claim 1 wherein said filter comprises a low pass filter having a cutoff frequency which is lower than a resonance frequency of said primary sensor.

11. A seismic sensor according to claim 5 wherein said damping means includes a resistive load.

12. A seismic sensor according to claim 7 wherein said means for producing a seismic output signal includes an operational amplifier.

13. A geophone assembly including:
a geophone operatively responsive to seismic movements so as to generate a seismic signal, said geophone having a coil, placed in a magnetic field in a first axis of sensitivity;
a tilt sensor operatively responsive to a gravitational field for generating a tilt signal indicative of an orientation of the sensor with reference to said gravitational field, said tilt sensor having a second axis of sensitivity parallel to said first axis of sensitivity;
a current generator responsive to said tilt signal so as to provide a current to said coil to induce a force on the coil that at least partially compensates for a weight of the coil, thereby ameliorating or eliminating a gravitational effect on said geophone,
means for damping a resonance of said geophone, said damping means being electrically coupled in parallel with said geophone and in series with said sensor; and
said current generator including a low pass filter for determining a DC voltage in response to said tilt signal to induce said current, said low pass filter being connected in series with, and between, said tilt sensor and said damping means.

14. A geophone assembly according to claim 13 further including means for producing a seismic output signal to be recorded in response to said seismic signal, said seismic output signal being proportional to said seismic signal.

15. A geophone assembly according to claim 13 wherein said tilt sensor is a micro-machined electro mechanical system accelerometer.

16. A geophone assembly according to claim 13 wherein said damping means includes a resistive load.

17. A geophone assembly according to claim 13 wherein said low pass filter has a cutoff frequency lower than a resonance frequency of said geophone.

18. A geophone assembly according to claim 14 wherein said means for producing a seismic output signal to be recorded in response to said seismic signal of said geophone comprises an operational amplifier.

19. A geophone assembly according to claim 13 wherein said low pass filter has a time constant in the order of minutes.

20. A seismic sensor according to claim 13 wherein an output of the tilt sensor is given by a function which is substantially equal to, or substantially proportional to, or substantially includes, the following term:
$\sin(\theta)$
where $\theta$ is an angle of inclination of an axis of sensitivity of the tilt sensor relative to said gravitational field.

21. A method of gravity compensation for a seismic sensor, said method including the steps of:
providing a seismic sensor responsive to seismic movements, said seismic sensor having a coil placed in a magnetic field, said seismic sensor defining a first axis of sensitivity; and
using an accelerometer having a second axis of sensitivity parallel to said first axis of sensitivity, said accelerometer being in combination with a low pass filter to generate an external bias current within said coil to induce a force on the coil that at least partially compensates for a weight of said coil, thereby ameliorating or eliminating a gravity effect on said seismic sensor.

22. A method according to claim 21, wherein the step of generating said external bias current includes the steps of:
detecting a gravity field by using said accelerometer to produce a tilt signal;
passing said tilt signal through said low pass filter having a cutoff frequency which is lower than a resonance frequency of said seismic sensor so as to generate said external bias current; and
applying said external bias current to said coil of said seismic sensor.

23. A method according to claim 21 further including the step of damping a resonance of said seismic sensor.

24. A method according to claim 21 further including the step of generating a gravity compensated signal from said seismic sensor in response to said seismic signal.

25. A method according to claim 21 further including the step of producing an output signal to be recorded in response to said gravity compensated signal, wherein said output signal is proportional to said gravity compensated signal.

26. A method according to claim 21 wherein said seismic sensor is a geophone.

27. A method according to claim 22, wherein said accelerometer is a micro-machined electro mechanical system accelerometer.

* * * * *

UNITED STATES PATENT AND TRADEMARK OFFICE
CERTIFICATE OF CORRECTION

| | | |
|---|---|---|
| PATENT NO. | : 7,292,504 B2 | Page 1 of 1 |
| APPLICATION NO. | : 10/513901 | |
| DATED | : November 6, 2007 | |
| INVENTOR(S) | : Francois Luc | |

It is certified that error appears in the above-identified patent and that said Letters Patent is hereby corrected as shown below:

On the Title Page:

In field (87), following PCT Pub. No., "WO03/096021" should read -- WO03/096071 --.

Signed and Sealed this

Eighth Day of April, 2008

JON W. DUDAS
*Director of the United States Patent and Trademark Office*